(12) United States Patent
Cadiz et al.

(10) Patent No.: US 7,885,395 B2
(45) Date of Patent: Feb. 8, 2011

(54) TELEPHONE CALL ROUTING

(75) Inventors: Jonathan J. Cadiz, Redmond, WA (US); Kuansan Wang, Bellevue, WA (US); Adwait Ratnaparkhi, Redmond, WA (US); Xuedong D. Huang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1414 days.

(21) Appl. No.: 11/341,278

(22) Filed: Jan. 27, 2006

(65) Prior Publication Data

US 2007/0189481 A1 Aug. 16, 2007

(51) Int. Cl.
*H04M 1/56* (2006.01)
*H04M 15/06* (2006.01)
*H04M 3/00* (2006.01)
*H04M 5/00* (2006.01)

(52) U.S. Cl. ............ 379/142.06; 379/142.07; 379/265.02; 379/266.02

(58) Field of Classification Search ............ 379/265.01, 379/265.02, 265.11, 265.12, 266.01, 266.02, 379/266.03, 266.1, 142.01, 142.04, 142.07, 379/201.08, 207.13, 207.14, 207.15

See application file for complete search history.

(56) References Cited

U.S. PATENT DOCUMENTS

| | | | |
|---|---|---|---|
| 6,542,594 B1 * | 4/2003 | LeBoulzec | 379/201.03 |
| 6,859,529 B2 * | 2/2005 | Duncan et al. | 379/266.1 |
| 6,870,924 B1 * | 3/2005 | Ukon | 379/265.02 |
| 7,110,525 B1 * | 9/2006 | Heller et al. | 379/265.11 |
| 7,263,178 B1 * | 8/2007 | Brothers et al. | 379/88.19 |
| 2004/0230689 A1 * | 11/2004 | Loveland | 709/229 |
| 2005/0175167 A1 * | 8/2005 | Yacoub et al. | 379/265.13 |

OTHER PUBLICATIONS

"SunRocket Taps Angel.com to Deliver Personalized Interactive Voice Response System for Call Center", http://www.angel.com/about/pr/pr11-10-05.jsp, (Nov. 10, 2005), 2 pgs.

* cited by examiner

*Primary Examiner*—Quoc D Tran
(74) *Attorney, Agent, or Firm*—L. Alan Collins; Collins & Collins Incorporated (57) ABSTRACT

Inbound calls to an enterprise are handled by a call-handling component, by identifying the calling party from intrinsic information about the call, by identifying a potential recipient from non-intrinsic information about the calling party, and by automatically routing the inbound call to a potential recipient.

20 Claims, 5 Drawing Sheets

TELEPHONE CALL ROUTING

BACKGROUND

Many companies, from small to large, make use of automated telephone receptionists (often referred to as "auto-attendants") to answer incoming calls. Commonly, the auto-attendant answers each call and presents the caller with a predetermined set of options for directing the call. Typically, the caller selects a desired option using the keypad of the telephone. An auto-attendant reduces the company's overhead costs while still enabling callers to reach individuals within the company. However, existing technologies make auto-attendants less than fully satisfying in most circumstances.

For example, it can be frustrating for people who make frequent calls to a company and are forced to enter the same set of options for each call. In addition, many individuals feel they should receive special treatment for being a good customer, and often the company agrees. However, the existing technologies do not provide an adequate solution to this problem. Certain individuals can be given a "direct dial" number to someone in the company. However, once a direct dial number is given out, it cannot be easily retracted. For that reason, if a once-good customer later becomes a bad customer, they will still have that direct dial number, which may be undesirable.

In summary, a superior auto-attendant has eluded those skilled in the art, until now.

SUMMARY

This summary is provided to introduce a selection of concepts in a simplified form that are further described below in the Detailed Description section. This summary is not intended to identify key features or essential features of the claimed subject matter, nor is it intended to be used to limit the scope of the claimed subject matter.

According to aspects of various described embodiments, implementations are provided for handling inbound telephone calls. Briefly stated, a notification of an inbound call is received. The notification includes intrinsic information, such as Caller ID data and/or the called number, that identifies a calling party that originated the inbound call. Non-intrinsic information about the calling party is also identified, such as empirical data about prior calls, statistical data about the caller, or declarative instructions concerning the caller. Using the non-intrinsic information about the calling party, the inbound call may be automatically directed to a recipient. In many cases a recipient is a natural person, although in some cases the recipient may be a particular node in a hierarchy of options.

DETAILED DESCRIPTION

Various embodiments are described more fully below with reference to the accompanying drawings, which form a part hereof, and which show specific exemplary implementations for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation, or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Briefly stated, inbound calls to an enterprise are handled by a call-handling component, by identifying the calling party from intrinsic information about the call, by identifying a potential recipient from non-intrinsic information about the calling party, and by automatically routing the inbound call to a potential recipient.

Figure 1:
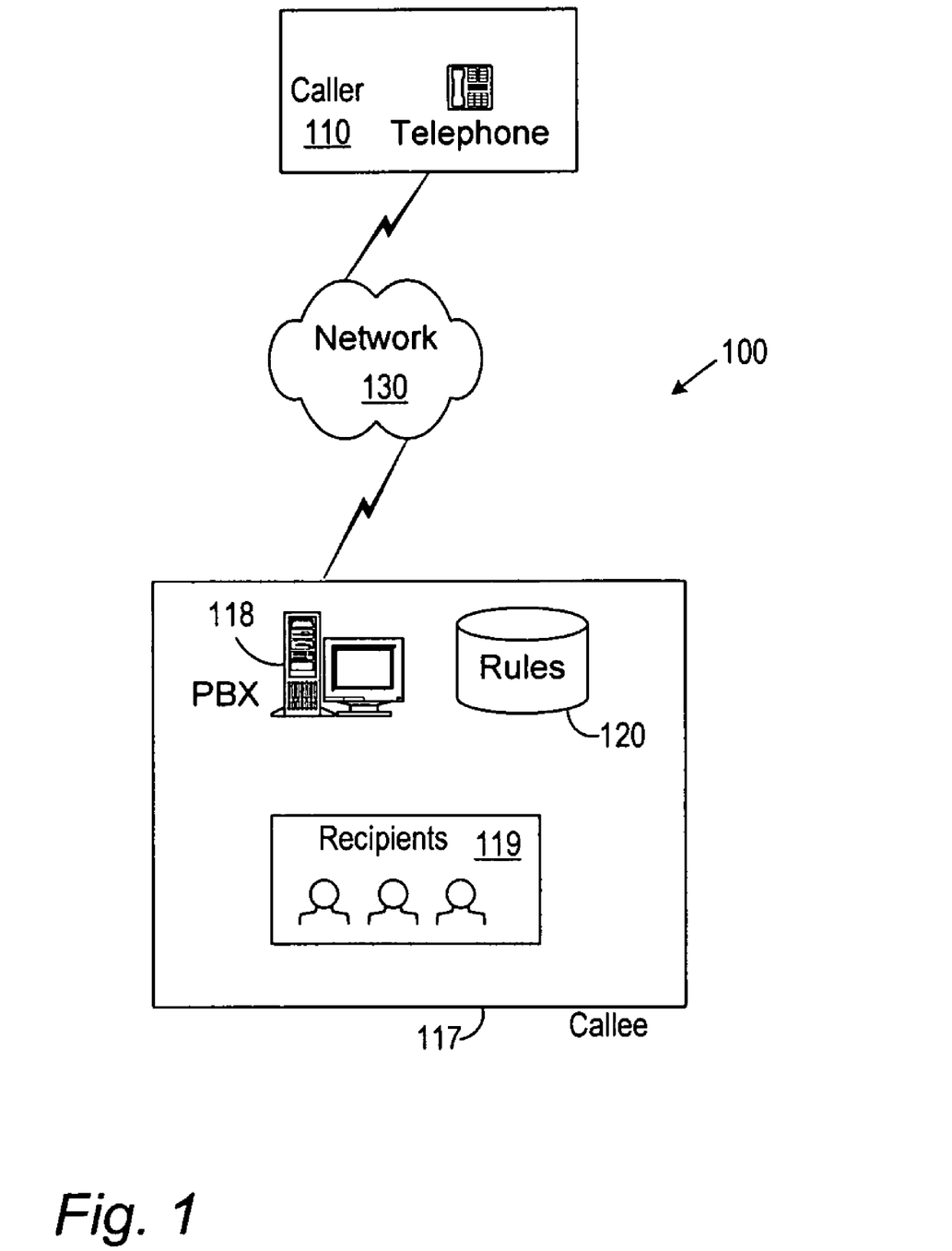
FIG. 1 is a functional block diagram of a system for routing inbound calls, in accordance with one embodiment.

FIG. 1 is a functional block diagram of a system for routing inbound calls. The following provides a conceptual overview of the system 100, which improves a calling party's experience. The system 100 includes a caller 110 and a callee 117. Generally stated, the caller may be any individual or entity that is capable of initiating telecommunications calls. The caller 110 may be outfitted with ordinary telecommunications equipment configured to communicate over a switched-circuit communications network, such as the Public Switched Telephone Network (PSTN), using conventional telephony devices. Alternatively, the caller 110 may be configured to communicate over a packet-based wide area network, such as the Internet, using Voice Over Internet Protocol (VoIP) devices. The infrastructure used to perform telephone calls between the caller 110 and others, such as the callee 117, shall be generically referred to as a "network" 130 and include any mechanism that supports telecommunications between two entities.

An inbound call is characterized by certain intrinsic information. For the purpose of this discussion, intrinsic information includes any information about an inbound call that is discoverable from the call data itself or from data directly associated with the inbound call. Examples of intrinsic information include, but are not limited to, the caller's telephone number (the 'calling' number), the number called by the caller (the 'called' number), and the time of day of the call. Much of the intrinsic information is available to the called party.

In this implementation, the callee 117 is a company or enterprise that has implemented an automated call handling device (PBX 118), including an auto attendant. Although described here in the context of a company or enterprise, in other embodiments the callee 117 could be any entity desirous of receiving inbound telephone calls. The callee 117 includes potential recipients 119, which may be individuals employed by the callee 117, departments within the callee 117, or even particular nodes in a hierarchical system of options within the auto attendant. Generally stated, each recipient 119 constitutes a potential end point for an inbound call. Recipients need not be natural people.

Calls made to the callee 117 are initially answered by the PBX 118, which attempts to automatically determine where to route the calls. Failing that, the PBX 118 presents the caller with the auto attendant, which offers the caller 110 options for choosing where the call should be routed.

In accordance with this embodiment, the PBX 118 evaluates the intrinsic information of the inbound call to first determine the identity of the calling party. In one simple example, the PBX 118 may retrieve caller ID information for the inbound call to identify the calling party (e.g., caller 110). Based on one or more call routing rules 120, the PBX 118 determines whether the call qualifies for special handling, such as direct routing to a particular recipient 119. If so, the PBX 118 handles the call in accordance with the appropriate call routing rule. If no particular rule applies, the call is passed to the auto attendant for handling.

The call routing rules 120 may include conditions that are based on non-intrinsic data about the caller 110, as identified from the intrinsic information. Many types of non-intrinsic data may be used, such as the call history of the caller. A non-exhaustive list of illustrative non-intrinsic data and call-routing rules are provided below in conjunction with FIG. 2.

Figure 2:
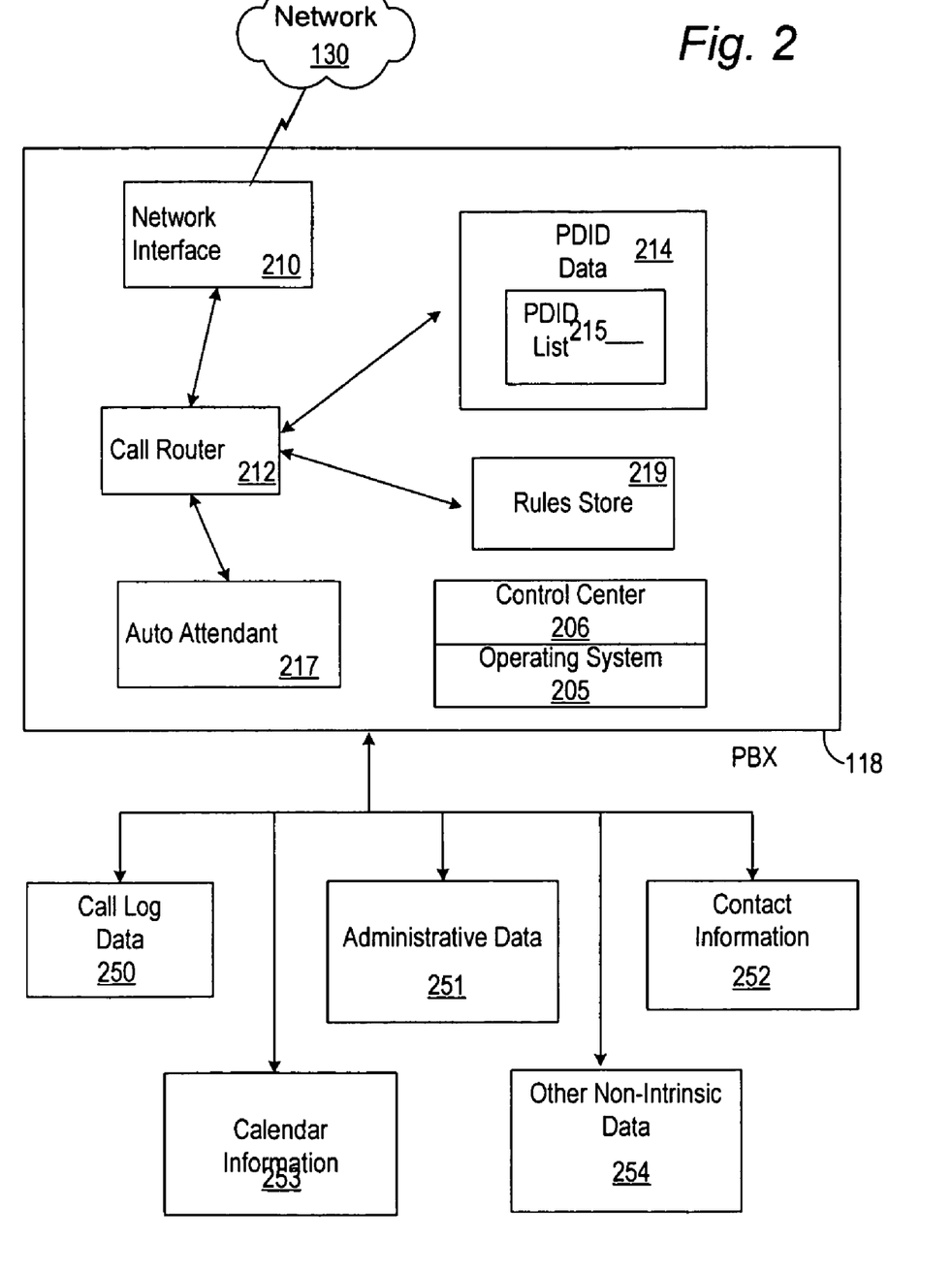
FIG. 2 is a functional block diagram illustrating in slightly greater detail the PBX introduced above in conjunction with FIG. 1.

FIG. 2 is a functional block diagram illustrating in slightly greater detail the PBX 118 introduced above in conjunction with FIG. 1. The PBX 118 includes, in this implementation, a network interface 210 coupled to at least one network 130, such as the PSTN or perhaps a wide area network, such as the Internet. The network interface 210 is responsible for receiving inbound calls placed to one or more telephone numbers assigned to the PBX 118, and is configured to identify intrinsic information about the inbound calls, such as Caller ID information, time of call, called number, and the like. The network interface 210 passes inbound calls to a call router 212.

The call router 212 is configured to identify the caller from the intrinsic information for an inbound call. In one example, the call router 212 may use caller ID information, such as a Multiple Data Message Format (MDMF) or Single Data Message Format (SDMF) tone transmitted with the inbound call, to identify the caller. In VoIP implementations, the caller could be identified from other call data transmitted in conjunction with the call. In most cases, the network interface 210 passes most of the intrinsic information when connecting calls to the call router 212. However, in certain cases the call router 212 may query the network interface 210 for additional intrinsic information to help identify the caller. For example, there could be two or more telephone numbers that route to the PBX 118, such as multiple toll free ('800') numbers for customer support and sales. In that example, the call router 212 may query the network interface 210 for DNIS data that identifies the particular number that was called.

The call router 212 is also configured to analyze other, non-intrinsic information associated with an identified caller in an effort to automatically direct the inbound call to a particular recipient (e.g., an individual, entity, department, resource or the like) within the company. Rules that describe and specify what non-intrinsic data to use to route calls from identified callers are stored in a rules store 219. These rules may be accessed and managed by an administrator or perhaps by individual recipients. The particular instances and even types of non-intrinsic data are practically limitless. However, what follows here are certain examples of such non-intrinsic data and how such data could be used to route inbound calls. While the list here may be extensive, it is non-exhaustive and is provided merely for guidance in the types of data that can be used and how it may be used.

In one implementation, the call router 212 can be programmed to access Personal Direct Inward Dialing (PDID) data 214 to automatically route a call from a particular caller to a particular recipient. For example, the call router 212 can be configured to allow an individual within the company to create a PDID list 215 that identifies certain callers that should be directly routed to that individual. Alternatively, the call router 212 could be in communication with contact information 252 for individuals within the company, and the individuals could set a flag (or the like) on any contact that the individual desires to be on the individual's PDID list. The call router 212 can examine the contact information 252 to assemble the global PDID data 214 for all the participating individuals in the company. Alternatively, the call router 212 could provide the individuals with access to a PDID management component that allows them to create and maintain their own PDID lists (e.g., PDID list 215) within the PDID data 214.

In many cases, the same caller could appear in multiple PDID lists. In such a case, the call router 212 can be configured to present the caller with a tailored set of call options. For example, the call router 212 could present the caller with a special call-attendant that asks the caller whether he or she would like to speak with X or Y, if the caller appears on both X and Y's PDID lists. Of course, in some cases the caller could appear on too many PDID lists for this option to be feasible. In such a case, the call router 212 could use other non-intrinsic data (such as call history data) to determine an acceptable subset of recipients to present. These and other examples will be apparent.

In another implementation, the call router 212 could be programmed to access other data stores to retrieve other data to assist in call routing decisions. For instance, administrative data 251 maintained by a department within the company could be used to help direct calls from certain callers. Administrative data 251 can be any type of business data maintained by the company in connection with its business. Examples include, but are not limited to, accounting data, inventory data, human resources data, or the like. The administrative data could be presented in statistical format, such as identifying a number of the company's largest suppliers or best customers.

In one example, the call router 212 could be in communication with administrative data 251 maintained by an accounting department. The call router 212 accesses that database to identify the company's ten highest-paying customers so that calls from those customers can be directly and automatically routed to a particular recipient, such as a top salesperson or the president of the company. In another example, the call router 212 could be configured to identify the company's largest vendors based on quantities of inventory on hand from each vendor. In yet another example, the administrative data 251 could include an employee records database so that if the call router 212 determines that an incoming call originated from an employee's home phone, that call could be directly routed to that employee, or the caller could be immediately asked whether they desire to be directly connected to the employee.

A call log database 250 can be used to collect empirical data about calls that have been made and routing decisions that have been made in the past by particular callers. The call router 212 can be configured to evaluate calling patterns and predict where a call should be routed. For example, if a particular caller has repeatedly selected the same options in a hierarchy of options presented during a call, this information would be noted in the call log data 250. Upon a subsequent call from that same caller, the call router 212 could cause the caller to be immediately offered the most often selected option. Many other decisions could also be made from the empirical information discerned from the call log database 250.

Calendar information 253 can also be made available to assist in routing decisions. For example, many calendars can be maintained for recipients that specify when the recipients are busy, out of the office, on vacation, and the like. Using this information, the call router 212 can verify that a particular recipient is available before routing a call to that recipient. In the case where a recipient is a particular conference room, for example, a calendar can be maintained that identifies when the conference room is occupied and which individuals are in the conference room. Incoming calls from a caller on a particular recipient's PDID list 215 could be automatically routed to the conference room.

The call router 212 can also access any other non-intrinsic data 254 to help route inbound calls from identified callers. The examples provided above are for illustrative purposes only, and many other examples of non-intrinsic data 254, in addition to those provided in this document, will become apparent to those skilled in the art.

As suggested above, recipients are often individuals, but they need not be. For example, in many circumstances the caller may simply be presented with the auto attendant 217 for handling. In those circumstances, the recipient may be the auto attendant or a particular option (node) within the auto attendant options.

It should also be noted that the caller can be presented with the options of being automatically routed or not. In other words, once a recipient has been identified using the above-described system, the caller can either be automatically routed to that recipient or, instead, simply queried whether he or she would like to be routed directly to that recipient. In this manner, the caller is presented with a more caller-friendly dialog rather than a generic auto attendant asking how to direct the call. In the case where the caller is asked whether to be automatically directed and the caller chooses not to be, an exception handling technique can be employed, such as redirecting the call to the generic auto-attendant, presenting the caller with other potential recipients (for example, in the case where the caller is on multiple PDID lists), or the like.

The PBX 118 may additionally include other components and/or software that are less relevant to the present disclosure, but which may be necessary for proper functioning. For example, an operating system 205 may be included on the PBX 118 to manage the hardware and software that implement the PBX 118. In addition, a management and configuration component (e.g., control center 206) may be included to enable an administrator or the like to configure and maintain the several components, both hardware and software, of the PBX 118.

Figure 3:
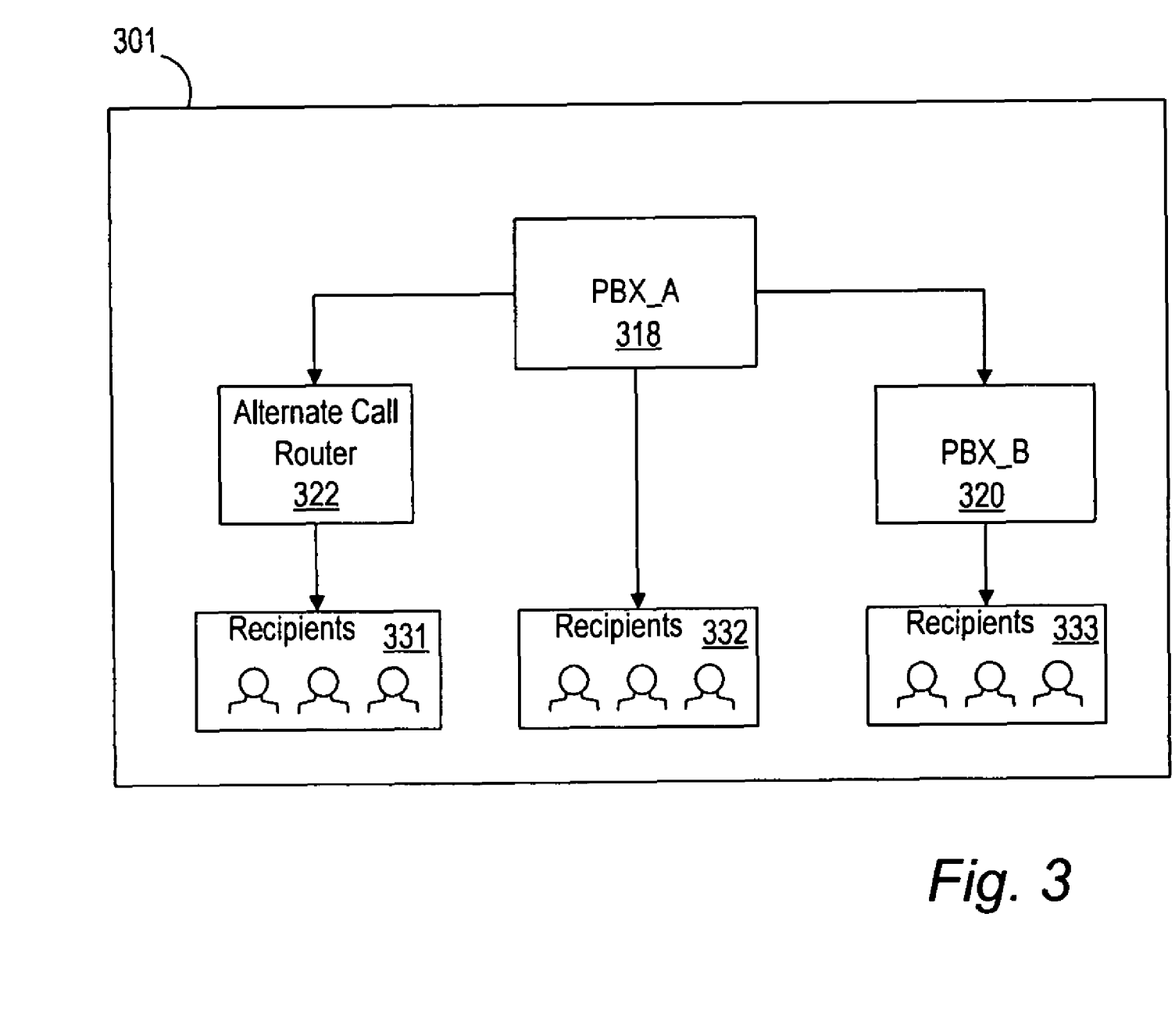
FIG. 3 is a functional block diagram generally illustrating an embodiment in which call routing functionality is distributed, in accordance with one embodiment.

FIG. 3 is a functional block diagram generally illustrating an embodiment in which call routing functionality is distributed. As shown in FIG. 3, an enterprise 301 receives inbound calls from a network 130 at a first PBX (e.g., PBX_A 318). This PBX is configured substantially as described above in conjunction with FIG. 2. However, in this embodiment the PBX (PBX_A 318) is configured such that inbound calls can be passed to other decision making components, such as another PBX (e.g., PBX_B 320) or directly to a remote alternate call router (e.g., alternate call router 'ACR' 322). In this embodiment, each component may be configured in like manner to the PBX 118 described above in conjunction with FIG. 2. Alternatively, each component could be configured with a special-purpose subset of the functionality described.

In this embodiment, each of the components may be associated with a subset of recipients (e.g., Recipients 331, 332, 333). The several components (e.g., PBX_A 318, PBX_B 320, ACR 322) can be located at any reasonable location, and are connected using a local or wide area network. In this manner, inbound calls could be automatically routed to a PBX that is, perhaps, geographically more close to the caller. For example, the enterprise 301 may have a national presence and provide on-site service in some form. Automatically routing an inbound call to recipients that are closer geographically allows the enterprise to better serve its customers by enabling someone close to the caller to handle the call.

In another example, one component (e.g., PBX_A 318) could be configured to answer all incoming calls. The first component could determine, perhaps based on originating area code, that certain calls have been identified for handling by a particular department (e.g., an 'east coast customers department' or the like). Those calls can be automatically passed to another component (e.g., PBX_B 320) responsible for those calls. Many other examples are also possible.

What follows are descriptions of generalized processes that implement various, nonexclusive embodiments of the invention. These processes may be implemented using computer-executable instructions in software or firmware, but may also be implemented in other ways, such as with programmable logic, electronic circuitry, or the like. A computer-readable medium may be encoded with such computer-executable instructions. In some alternative embodiments, certain of the operations may even be performed with limited human intervention. Moreover, these processes are not to be interpreted as exclusive of embodiments, but rather are provided as illustrative only.

Figure 4:
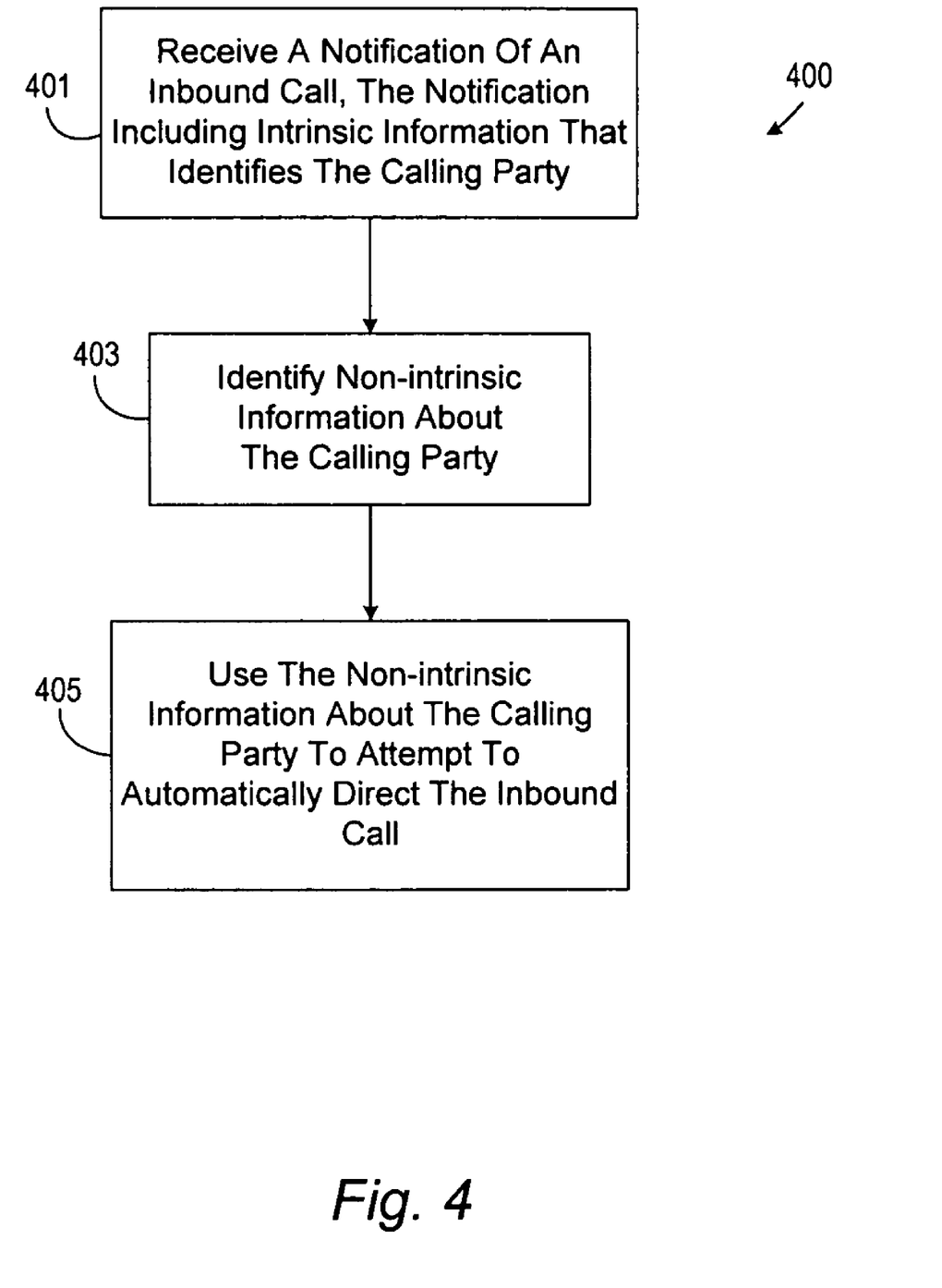
FIG. 4 is an operational flow diagram generally illustrating a process for handling inbound telephone calls, in accordance with one embodiment.

FIG. 4 is an operational flow diagram generally illustrating a process 400 for handling inbound telephone calls, in accordance with one embodiment of the invention. At block 401, a notification of an inbound call is received. The notification includes intrinsic information that identifies a calling party that originated the inbound call. Many examples of intrinsic information are available, such as caller ID information, the called number, VoIP set-up data, and the like.

At block 403, non-intrinsic information about the calling party is identified. For example the non-intrinsic information could be empirical data, statistical data, or declarative instructions to forward calls from certain callers to pre-selected recipients. In alternative embodiments, the non-intrinsic information can include any information about a caller that can be used in a determination of how to handle an inbound call from the caller.

At block 405, the non-intrinsic information about the calling party is used to attempt to automatically direct the inbound call. For example, the non-intrinsic information could have included a determination that the caller is one of the callee's ten best customers. In addition, the intrinsic information from block 401 could indicate that the caller was calling a sales number. Based on that information, the inbound call could be routed directly to the head of the sales department rather than an ordinary sales person. Alternatively, the caller could merely be queried whether the caller would like to be automatically directed.

Figure 5:
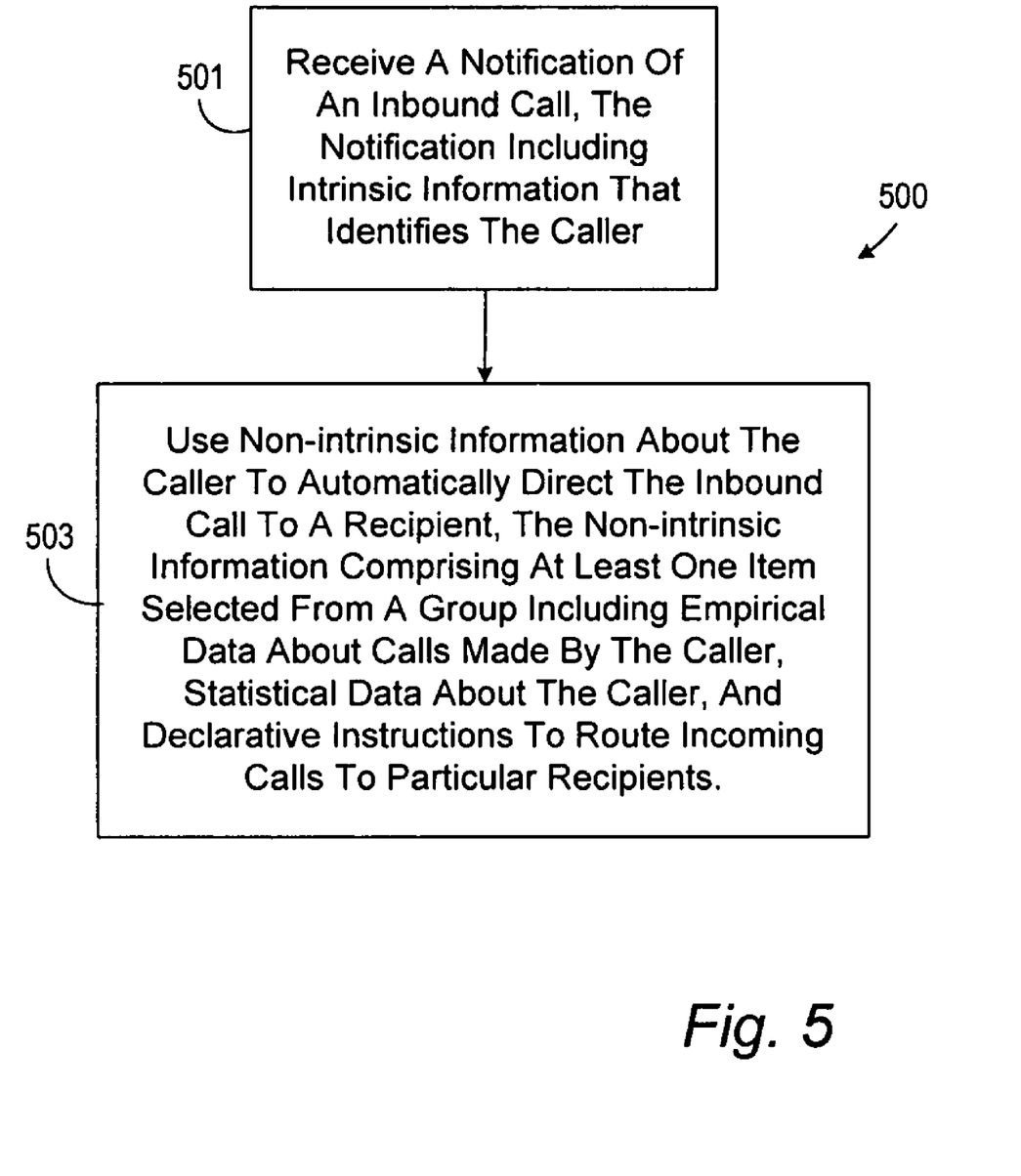
FIG. 5 is an operational flow diagram generally illustrating another process for handling inbound telephone calls, in accordance with one embodiment.

FIG. 5 is an operational flow diagram generally illustrating another process 500 for handling inbound telephone calls. At block 501, a notification of an inbound call is received. The notification includes intrinsic information that identifies a calling party that originated the inbound call. Many examples of intrinsic information are available, such as caller ID information, VoIP set-up data, and the like.

At block 503, non-intrinsic information about the calling party is used to automatically direct the inbound call to a recipient. The non-intrinsic information includes at least one item selected from a group of items, the group including empirical data about calls made by the calling party, statistical data about the calling party, and declarative instructions to route incoming calls to particular recipients. In alternative embodiments, the non-intrinsic information can include any information about a caller that can be used in a determination of how to handle an inbound call from the caller.

Although the processes shown in FIGS. 4 and 5 are illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Reference has been made throughout this specification to "one embodiment," "an embodiment," or "an example embodiment" meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention.

What is claimed is:

1. A method for handling inbound telephone calls, comprising:
    receiving a notification of an inbound call, wherein the notification includes first information that identifies a caller that originated the inbound call and that includes a phone number of the caller and a called phone number and a time of the inbound call;
    identifying second information about the caller based on the first information, wherein the second information is identifiable based on the first information and does not include the first information; and
    using the second information about the caller and a plurality of Personal Direct Inward Dialing ("PDID") lists to automatically direct the inbound call to a recipient, wherein each PDID list is associated with a different potential inbound call recipient, and wherein for each PDID list the corresponding potential inbound call recipient is provided with access to configure the PDID list; and
    wherein the method is performed by a computing device.

2. The method recited in claim 1, wherein the second information about the caller comprises empirical data collected about call patterns of the caller.

3. The method recited in claim 2, wherein the empirical data comprises historical data describing prior calls made by the caller.

4. The method recited in claim 3, wherein the historical data describes options selected by the caller during the prior calls.

5. The method recited in claim 1, wherein the second information about the caller comprises statistical data about the caller.

6. The method recited in claim 5, wherein the statistical data comprises information about business dealings of the caller.

7. The method recited in claim 6, wherein the information about the business dealings comprise an amount of goods or services purchased from the caller, or an amount of goods or services sold to the caller, or a number of calls made by the caller to a particular recipient within an enterprise.

8. The method recited in claim 1, wherein the first information comprises caller ID data, and Dialed Number Identification Service (DNIS) data that specifies a called number.

9. The method recited in claim 1, wherein the second information about the caller comprises an instruction to automatically direct inbound calls from the caller to a particular recipient.

10. The method recited in claim 9, wherein the instruction is embodied in a personal direct inward dialing list maintained by the particular recipient.

11. The method recited in claim 9, wherein the instruction is developed by referring to a collection of contact information.

12. The method recited in claim 11, wherein developing the instruction is performed by:
    identifying the caller in at least one of the plurality of PDID lists,
    determining a highest priority recipient from among the potential inbound call recipients associated with the at least one of the plurality of PDID lists, and
    automatically directing the inbound call to the highest priority recipient.

13. The method recited in claim 11, wherein the collection of contact information is embodied as a data store of potential callers that may make inbound calls to an enterprise.

14. The method recited in claim 13, wherein the data store comprises a human resources database of contact information about individuals employed by the enterprise.

15. A computer storage medium encoded with computer-executable instructions that, when executed by a computing device, cause the computing device to perform the method recited in claim 1.

16. At least one computer-readable medium comprising an article of manufacture that is encoded with computer-executable instructions that, when executed by a computing device, cause the computing device to perform a method for handling inbound telephone calls, the method comprising:
    receiving a notification of an inbound call, the notification including first intrinsic information that identifies a caller that originated the inbound call and a called number; and
    using second information about the caller and a plurality of Personal Direct Inward Dialing ("PDID") lists to automatically direct the inbound call to a recipient, the second information including empirical data about calls made by the caller, statistical data about the caller, and declarative instructions to route incoming calls to particular recipients, wherein each PDID list is associated with a different potential recipient, and wherein for each PDID list the corresponding potential inbound call recipient is provided with access to configure the PDID list, and wherein the second information is identifiable based on the first information and does not include the first information.

17. The at least one computer-readable medium recited in claim 16, wherein using the second information further comprises referring to calendar information maintained by the recipient to determine an appropriate time or place to route the inbound call to the recipient.

18. The at least one computer-readable medium recited in claim 16, wherein the declarative instructions comprise personal lists of potential calling parties for whom inbound calls should be routed directly to particular recipients.

19. A system for routing inbound telephone calls, comprising:
 a network interface coupled to a network, the network interface being configured to receive inbound calls and to identify first information about the inbound calls;
 a rules store in which reside rules for identifying recipients to which inbound calls should be routed, the rules being based on data about identified callers;
 a data store in which resides second information about calling parties, the second non intrinsic information including empirical data about prior inbound calls made by the calling parties; and
 a call router coupled to the network interface, the rules store, and the data store, the call router being configured to determine an identity of a caller from the first information about an inbound call, to apply the rules from the rules store in conjunction with the second information about the caller and a plurality of Personal Direct Inward Dialing ("PDID") lists, and to route the inbound call to an appropriate recipient based on a result of applying the rules, wherein each PDID list is associated with a different potential recipient, and wherein for each PDID list the corresponding potential inbound call recipient is provided with access to configure the PDID list.

20. The system recited in claim 19, wherein the second information further comprises personal lists of potential calling parties for whom inbound calls should be routed directly to particular recipients, calendar information operative to identify an appropriate time and/or place to route inbound calls to a recipient with which the calendar information is associated, and statistical data about calling parties.

* * * * *

UNITED STATES PATENT AND TRADEMARK OFFICE
CERTIFICATE OF CORRECTION

PATENT NO. : 7,885,395 B2  
APPLICATION NO. : 11/341278  
DATED : February 8, 2011  
INVENTOR(S) : Jonathan J. Cadiz et al.

Page 1 of 1

It is certified that error appears in the above-identified patent and that said Letters Patent is hereby corrected as shown below:

In column 8, line 23, in Claim 8, after "data" delete "that specifies a called number".

In column 8, line 59, in Claim 16, after "first" delete "intrinsic".

In column 10, line 2, in Claim 19, after "second" delete "non intrinsic".

Signed and Sealed this  
Nineteenth Day of July, 2011

David J. Kappos  
*Director of the United States Patent and Trademark Office*